(12) United States Patent
Bae et al.

(10) Patent No.: US 12,455,319 B2
(45) Date of Patent: Oct. 28, 2025

(54) APPARATUS AND METHOD FOR DIAGNOSING BATTERY

(71) Applicant: LG Energy Solution, Ltd., Seoul (KR)

(72) Inventors: Yoon-Jung Bae, Daejeon (KR); Kyung-Hwa Woo, Daejeon (KR); Hee-Seok Jeong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/881,368

(22) PCT Filed: Nov. 1, 2023

(86) PCT No.: PCT/KR2023/017290
§ 371 (c)(1),
(2) Date: Jan. 6, 2025

(87) PCT Pub. No.: WO2024/096585
PCT Pub. Date: May 10, 2024

(65) Prior Publication Data
US 2025/0172617 A1    May 29, 2025

(30) Foreign Application Priority Data
Nov. 1, 2022   (KR) .......................... 10-2022-0144059

(51) Int. Cl.
*G01R 31/367* (2019.01)
*G01R 31/3842* (2019.01)
(Continued)

(52) U.S. Cl.
CPC ....... *G01R 31/367* (2019.01); *G01R 31/3842* (2019.01); *G01R 31/392* (2019.01); *G01R 31/396* (2019.01)

(58) Field of Classification Search
CPC ............. G01R 31/367; G01R 31/3842; G01R 31/392; G01R 31/396
(Continued)

(56) References Cited

U.S. PATENT DOCUMENTS 8,283,899 B2 * 10/2012 Esnard .................. H02J 7/0031
320/162
9,276,298 B2  3/2016 Brown et al.
(Continued)

FOREIGN PATENT DOCUMENTS

CN    103163480 A    6/2013
CN    103545567 B *  2/2016 ............. B07C 5/344
(Continued)

OTHER PUBLICATIONS

T. Wang, J. Yang, H. Lei, M. Gu, S. Leng and Y. Meng, "State of Health Estimation for Satellite Batteries Based on the Charge Curves," 2021 2nd China International SAR Symposium (CISS), Shanghai, China, 2021, pp. 1-4 (Year: 2021).*
(Continued)

*Primary Examiner* — M Baye Diao
(74) *Attorney, Agent, or Firm* — Lerner David LLP (57) ABSTRACT

An apparatus for diagnosing a battery includes a data obtaining unit configured to obtain battery information including voltage and current of a battery during a charging cycle of the battery; and a control unit configured to calculate a constant current charging capacity ratio and a constant voltage charging capacity ratio during the charging cycle based on the battery information, and diagnose a state of the battery based on the constant current charging capacity ratio and the constant voltage charging capacity ratio.

10 Claims, 4 Drawing Sheets

(51) Int. Cl.
*G01R 31/392* (2019.01)
*G01R 31/396* (2019.01)

(58) Field of Classification Search
USPC .......................................................... 320/132
See application file for complete search history.

(56) References Cited

U.S. PATENT DOCUMENTS

| | | | |
|---|---|---|---|
| 2003/0076074 A1 | 4/2003 | Kawai | |
| 2012/0116701 A1* | 5/2012 | Yuasa | H01M 10/44 324/427 |
| 2012/0306436 A1 | 12/2012 | Nakamura et al. | |
| 2014/0306712 A1* | 10/2014 | Esnard-Domerego | G01R 31/392 324/426 |
| 2016/0003911 A1* | 1/2016 | Lim | G01R 31/382 324/427 |
| 2019/0391210 A1 | 12/2019 | Zhu et al. | |
| 2020/0081068 A1 | 3/2020 | Kim et al. | |
| 2020/0408846 A1 | 12/2020 | Bae et al. | |
| 2022/0317197 A1 | 10/2022 | Kim et al. | |

FOREIGN PATENT DOCUMENTS

| | | | |
|---|---|---|---|
| CN | 111136033 A | 5/2020 | |
| JP | H11329512 A | 11/1999 | |
| JP | 3990107 B2 | 10/2007 | |
| JP | 5365119 B2 | 12/2013 | |
| JP | 2015059816 A * | 3/2015 | ............ Y02E 60/10 |
| JP | 6044114 B2 | 12/2016 | |
| JP | 202087640 A | 6/2020 | |
| KR | 20180005345 A | 1/2018 | |
| KR | 20190118534 A | 10/2019 | |
| KR | 102117316 B1 | 6/2020 | |
| KR | 20210048810 A | 5/2021 | |
| KR | 102261481 B1 | 6/2021 | |

OTHER PUBLICATIONS

International Search Report for Application No. PCT/KR2023/017290 mailed Feb. 22, 2024, 3 pages.
Extended European Search Report including Written Opinion for Application No. 23886281.7 dated May 16, 2025, pp. 1-11.

* cited by examiner

APPARATUS AND METHOD FOR DIAGNOSING BATTERY

CROSS-REFERENCE TO RELATED APPLICATIONS

The present application is a national phase entry under 35 U.S.C. § 371 of International Application No. PCT/KR2023/017290, filed Nov. 1, 2023, published as International Publication No. WO2024/096585A1, which claims priority from Korean Patent Application No. 10-2022-0144059, filed Nov. 1, 2022, all of which are hereby incorporated herein by reference in their entireties.

TECHNICAL FIELD

The present disclosure relates to an apparatus and method for diagnosing a battery, and more particularly, to an apparatus and method for diagnosing a battery, which is capable of diagnosing a state of a battery in a non-destructive manner.

BACKGROUND

Recently, the demand for portable electronic products such as notebook computers, video cameras and portable telephones has increased sharply, and electric vehicles, energy storage batteries, robots, satellites and the like have been developed in earnest. Accordingly, high-performance batteries allowing repeated charging and discharging are being actively studied.

Batteries commercially available at present include nickel-cadmium batteries, nickel hydrogen batteries, nickel-zinc batteries, lithium batteries and the like. Among them, the lithium batteries are in the limelight since they have almost no memory effect compared to nickel-based batteries and also have very low self-charging rate and high energy density.

These batteries may deteriorate as charging and discharging continues. For example, gas generation may reduce electron transportation force within the electrode, resulting in negative electrode deterioration imbalance. Additionally, since the gas generated by the battery may lead to ignition, there is a problem that an unexpected accident may occur if the battery state diagnosis is not carried out quickly.

SUMMARY OF THE INVENTION

Technical Problem

The present disclosure is designed to solve the problems of the related art, and therefore the present disclosure is directed to providing an apparatus and method for diagnosing a battery, which may diagnose a state of battery in a non-destructive manner through profile analysis.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

An apparatus for diagnosing a battery according to one aspect of the present disclosure may comprise a control unit configured to calculate a constant current charging capacity ratio and a constant voltage charging capacity ratio based on battery information including voltage and current of a battery during a charging cycle of the battery, and diagnose a state of the battery based on the constant current charging capacity ratio and the constant voltage charging capacity ratio.

The control unit may be configured to determine a charging total capacity, obtain each of a constant current charging capacity and a constant voltage charging capacity from the charging total capacity, and calculate the constant current charging capacity ratio and the constant voltage charging capacity ratio, respectively, based on the charging total capacity, the constant current charging capacity and the constant voltage charging capacity.

The control unit may be configured to diagnose the state of the battery based on an increase or decrease of each of the constant current charging capacity ratio and the constant voltage charging capacity ratio.

The control unit may be configured to diagnose the state of the battery as a negative electrode stabilization state in response to the constant current charging capacity ratio increasing and the constant voltage charging capacity ratio decreasing.

The control unit may be configured to maintain a charging cut-off condition of the battery in response to the state of the battery being diagnosed as the negative electrode stabilization state.

The control unit may be configured to calculate the constant current charging capacity ratio and the constant voltage charging capacity ratio in response to a charging total capacity of the battery decreasing during the charging cycle of the battery.

The control unit may be configured to repeatedly determine a charging total capacity for multiple charging cycles of the battery, in each given charging cycle, compare the charging total capacity of the given charging cycle with the charging total capacity of a previous charging cycle, and determine whether to calculate the constant current charging capacity ratio and the constant voltage charging capacity ratio for the given charging cycle based on the comparison of the charging total capacity of the given charging cycle with the charging total capacity of the previous charging cycle.

The control unit may be configured to repeatedly determine a charging total capacity for multiple charging cycles of the battery, and in each given charging cycle, compare the charging total capacity of the given charging cycle with the charging total capacity of a previous charging cycle in response to the given charging cycle being included within a preset criterion cycle section.

A battery pack according to another aspect of the present disclosure may comprise the apparatus for diagnosing a battery as shown in any of the embodiments of the present disclosure.

A method for diagnosing a battery according to still another aspect of the present disclosure may comprise: calculating a constant current charging capacity ratio and a constant voltage charging capacity ratio based on battery information including voltage and current of a battery during a charging cycle of the battery; and diagnosing a state of the battery based on the constant current charging capacity ratio and the constant voltage charging capacity ratio.

Advantageous Effects

According to one aspect of the present disclosure, the state of the battery may be diagnosed in a non-destructive manner through profile analysis. In particular, the state of the battery may be specifically diagnosed using the constant current charging capacity ratio and the constant voltage charging capacity ratio of the battery.

The effects of the present disclosure are not limited to the effects mentioned above, and other effects not mentioned will be clearly understood by those skilled in the art from the description of the claims.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise.

In addition, throughout the specification, when a portion is referred to as being "connected" to another portion, it is not limited to the case that they are "directly connected", but it also includes the case where they are "indirectly connected" with another element being interposed between them.

Hereinafter, a preferred embodiment of the present disclosure will be described in detail with reference to the accompanying drawings.

Figure 1:
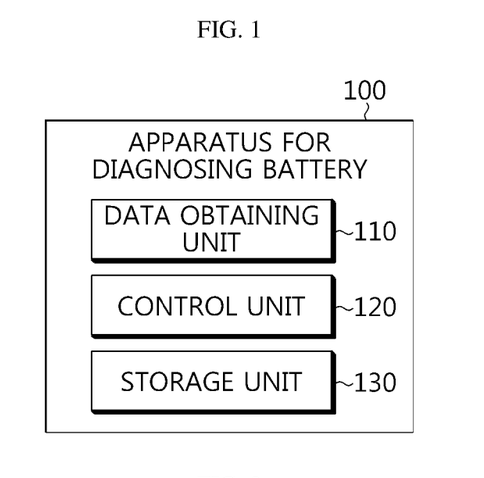
FIG. 1 is a diagram schematically showing an apparatus for diagnosing a battery according to an embodiment of the present disclosure.

FIG. 1 is a diagram schematically illustrating an apparatus 100 for diagnosing a battery according to an embodiment of the present disclosure.

Referring to FIG. 1, the apparatus 100 for diagnosing a battery may include a data obtaining unit 110 and a control unit 120.

Here, the battery refers to an independent cell that has a negative electrode terminal and a positive electrode terminal and is physically separable. As an example, a lithium-ion cell or a lithium polymer cell may be considered a battery. Additionally, the battery may mean a battery module or a battery pack in which a plurality of cells are connected in series and/or parallel. Hereinafter, for convenience of explanation, the battery is explained as meaning one independent cell.

The data obtaining unit 110 may obtain battery information including voltage and current of the battery in the charging cycle. For example, the data obtaining unit 110 may obtain battery information including voltage and current of the battery measured during the battery charging process.

Here, the charging process of the battery may include constant current (CC) charging and constant voltage (CV) charging. Note that below, for convenience of explanation, constant current charging and CC charging, and constant voltage charging and CV charging are used interchangeably.

Here, the battery refers to an independent cell that has a negative electrode terminal and a positive electrode terminal and is physically separable. As an example, a lithium-ion cell or a lithium polymer cell may be considered a battery. Additionally, the battery may mean a battery module in which a plurality of cells are connected in series and/or parallel. Additionally, the battery may mean a battery pack in which a plurality of battery modules are connected in series and/or parallel. Hereinafter, for convenience of explanation, the battery is explained as meaning one cell.

Depending on the embodiment, the data obtaining unit 110 may obtain battery information measured through a voltage sensing line connected to the positive electrode and the negative electrode of the battery. Additionally, the data obtaining unit 110 may be connected to a current sensor that measures the current of the battery. Also, the data obtaining unit 110 may obtain battery information from the current sensor through the current sensing line.

The data obtaining unit 110 may obtain battery information including the voltage and current of the battery in real time during the charging cycle of the battery.

Depending on the embodiment, the data obtaining unit 110 may be configured to communicate with the outside. The data obtaining unit 110 may receive battery information from the outside using communication.

The control unit 120 and the data obtaining unit 110 may be connected wired and/or wirelessly to communicate with each other. Additionally, the control unit 120 may receive battery information from the data obtaining unit 110 through a wired line and/or a wireless communication network.

The control unit 120 may calculate a constant current charging capacity ratio and a constant voltage charging capacity ratio during the charging cycle based on the battery information obtained from the data obtaining unit 110.

The charging cycle may mean charging the battery from the lower limit to the upper limit of a preset charging voltage section while maintaining the temperature of the battery constant and then stopping charging. The charging cycle may be included in the charging and discharging cycle along with the discharging cycle. The discharging cycle may mean stabilizing the battery for a certain period of time after the charging cycle is completed, then discharging the battery from the upper limit to the lower limit of a preset discharging voltage section while maintaining the temperature of the battery the same as the charging cycle, and then stopping discharging. The charging voltage section and the discharging voltage section may be the same or different. However, when performing a plurality of charging and discharging cycles, it is desirable that the charging voltage sections between the charging cycles are the same and the discharging voltage sections between the discharging cycles are the same.

In another example, the charging cycle means charging the battery from the lower limit to the upper limit of a preset charging voltage section while maintaining the temperature of the battery constant and then stopping charging. The discharging cycle means starting discharging from the upper limit of a preset discharging voltage section, integrating the discharging current, and stopping discharging when the current integration value reaches a preset discharging capacity. When performing a plurality of charging and discharging cycles, it is desirable that the charging voltage sections between the charging cycles are the same and the discharging capacities between the discharging cycles are the same.

The control unit 120 may calculate a constant current charging capacity ratio and a constant voltage charging capacity ratio during the charging cycle.

Specifically, the control unit 120 may be configured to classify the charging total capacity in the charging cycle into a constant current charging capacity and a constant voltage charging capacity. Additionally, the control unit 120 may be configured to calculate the constant current charging capacity ratio and the constant voltage charging capacity ratio, respectively, based on the charging total capacity, the constant current charging capacity, and the constant voltage charging capacity.

Here, the constant current charging capacity may mean a capacity charged by constant current charging. Conversely, the constant voltage charging capacity may mean a capacity charged by constant voltage charging.

For example, the control unit 120 may calculate the constant current charging capacity ratio by calculating the ratio of the constant current charging capacity to the charging total capacity in the charging cycle. Additionally, the control unit 120 may calculate the constant voltage charging capacity ratio by calculating the ratio of the constant voltage charging capacity to the charging total capacity.

Depending on the embodiment, the control unit 120 may receive information about the charging total capacity, the constant current charging capacity, and the constant voltage charging capacity measured during the CC-CV charging process of the battery. In this case, the control unit 120 may calculate the constant current charging capacity ratio and the constant voltage charging capacity ratio based on the received information.

The control unit 120 may determine the state of the battery based on the constant current charging capacity ratio and the constant voltage charging capacity ratio.

Specifically, the control unit 120 may diagnose the state of the battery as a negative electrode stabilization state or a deterioration state. For example, the deterioration state refers to a state in which the battery is deteriorated and the SOH (state of health) is reduced from the initial level. Also, the negative electrode stabilization state refers to a state in which the negative electrode of the battery is stabilized. For example, the stabilization state mainly appears in the initial cycle when the battery begins to be used, and refers to a state in which the reaction area of the negative electrode increases during the contraction and expansion of the active material during initial charging and discharging. In other words, the stabilization state is a state that may appear in a normal battery, and may be distinguished from the deterioration state.

Figure 2:
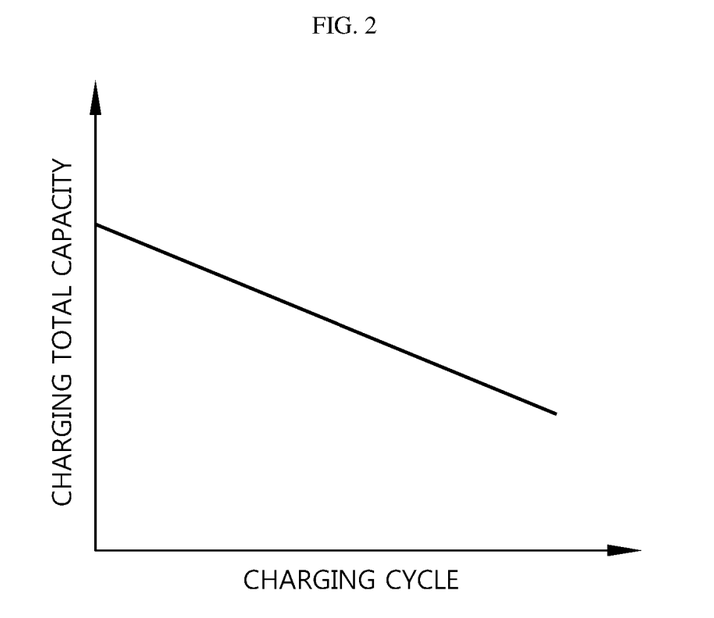
FIG. 2 is a diagram schematically showing a charging total capacity profile according to an embodiment of the present disclosure.

FIG. 2 is a diagram schematically showing a charging total capacity profile according to an embodiment of the present disclosure. FIG. 2 shows an X-Y two-dimensional graph where X is set to the charging cycle and Y is set to the charging total capacity. Referring to the charging total capacity profile in FIG. 2, it can be seen that the charging total capacity linearly decreases as the charging cycle increases.

Generally, as the battery deteriorates (as the charging cycle increases), the total charging capacity of the battery may decrease. However, even if the state of the battery is a negative electrode stabilization state in the initial cycle of the battery, the charging total capacity may decrease. That is, if the state of the battery is a deterioration state or a negative electrode stabilization state, the charging total capacity may be reduced.

In other words, the apparatus 100 for diagnosing a battery according to an embodiment of the present disclosure has the advantage of specifically diagnosing the state of the battery as a deterioration state or a negative electrode stabilization state using a non-destructive manner.

Meanwhile, the control unit 120 included in the apparatus 100 for diagnosing a battery may optionally include processors, application-specific integrated circuits (ASICs), other chipsets, logic circuits, registers, communication modems, data processing devices, etc. known in the art to execute various control logics performed in the present disclosure. Also, when the control logic is implemented as software, the control unit 120 may be implemented as a set of program modules. At this time, the program module may be stored in the memory and executed by the control unit 120. The memory may be inside or outside the control unit 120 and may be connected to the control unit 120 by various well-known means.

In addition, the apparatus 100 for diagnosing a battery may further include a storage unit 130. The storage unit 130 may store data necessary for operation and function of each component of the apparatus 100 for diagnosing a battery, data generated in the process of performing the operation or function, or the like. The storage unit 130 is not particularly limited in its kind as long as it is a known information storage means that can record, erase, update and read data. As an example, the information storage means may include random access memory (RAM), flash memory, read-only memory (ROM), electrically erasable programmable read-only memory (EEPROM), registers, and the like. In addition, the storage unit 130 may store program codes in which processes executable by the control unit 120 are defined.

The control unit 120 may classify the charging total capacity in the charging cycle into a constant current charging capacity and a constant voltage charging capacity.

For example, control unit 120 may classify the capacity charged by the constant current charging among the charging total capacity into a constant current charging capacity, and classify the capacity charged by the constant voltage charging among the charging total capacity into a constant voltage charging capacity.

The control unit 120 may calculate the constant current charging capacity ratio and the constant voltage charging capacity ratio based on the charging total capacity, the constant current charging capacity, and the constant voltage charging capacity.

For example, the control unit 120 may calculate the constant current charging ratio by comparing the constant current charging capacity with the charging total capacity. Specifically, the control unit 120 may calculate the constant current charging capacity ratio by calculating the ratio of the constant current charging capacity to the charging total capacity in the charging cycle. Additionally, the control unit 120 may calculate the constant voltage charging capacity ratio by calculating the ratio of the constant voltage charging capacity to the charging total capacity.

Additionally, the control unit 120 may be configured to diagnose the state of the battery based on the increase or decrease of each of the constant current charging capacity ratio and the constant voltage charging capacity ratio.

Preferably, the control unit 120 may diagnose the state of the battery by considering both of the increase or decrease of the constant current charging capacity ratio and the increase or decrease of the constant voltage charging capacity ratio.

For example, if the constant current charging capacity ratio increases and the constant voltage charging capacity ratio decreases, the control unit 120 may diagnose the state of the battery as a negative electrode stabilization state.

As another example, if the constant current charging capacity ratio decreases and the constant voltage charging capacity ratio increases, the control unit 120 may diagnose the state of the battery as a deterioration state.

Figure 3:
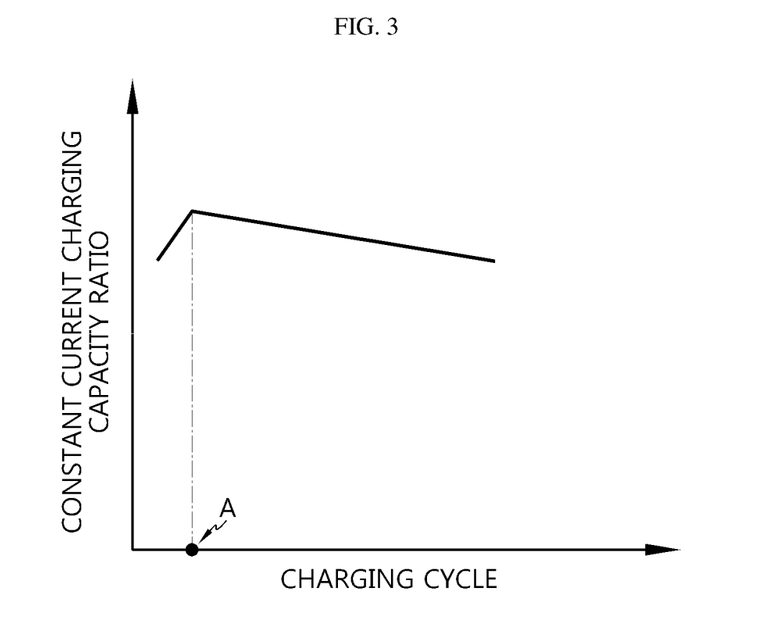
FIG. 3 is a diagram schematically showing a constant current capacity charging ratio profile according to an embodiment of the present disclosure.

FIG. 3 is a diagram schematically showing a constant current capacity charging ratio profile according to an embodiment of the present disclosure. FIG. 3 shows an X-Y two-dimensional graph where X is set to the charging cycle and Y is set to the constant current charging capacity ratio.

Referring to FIG. 3, it can be seen that the constant current charging capacity ratio shows a linear increase according to cycles, and then sharply decreases at specific point A.

Figure 4:
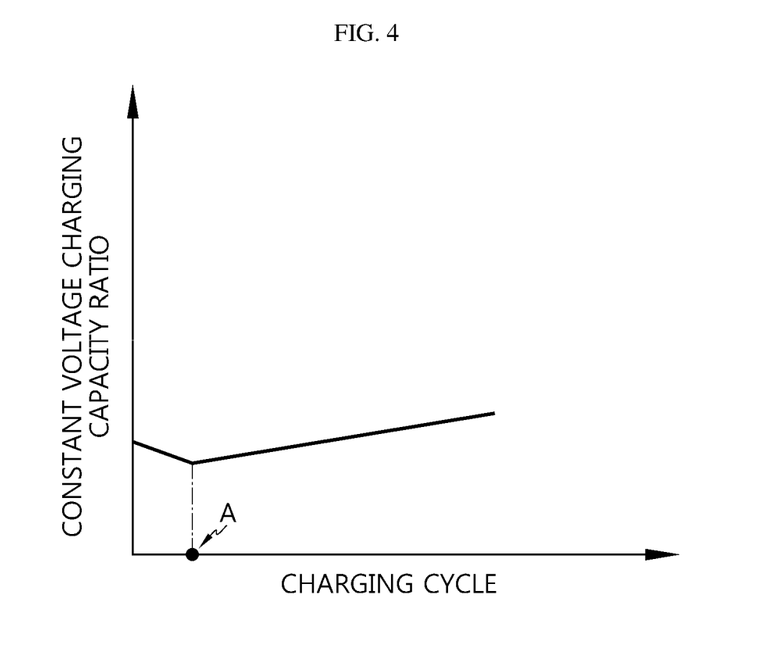
FIG. 4 is a diagram schematically showing a constant voltage capacity charging ratio profile according to an embodiment of the present disclosure.

FIG. 4 is a diagram schematically showing a constant voltage capacity charging ratio profile according to an embodiment of the present disclosure. FIG. 4 shows an X-Y two-dimensional graph where X is set to the charging cycle and Y is set to the constant voltage charging capacity ratio.

Referring to FIG. 4, it can be seen that the constant voltage charging capacity ratio shows a linear decrease according to cycles, and then rapidly increases at the specific point A.

Preferably, the specific point A in FIG. 3 and the specific point A in FIG. 4 may be points indicating the same charging cycle. For example, the specific point A in FIG. 3 and the specific point A in FIG. 4 may represent 30 cycles.

Referring to FIGS. 3 and 4, it can be seen that in the charging cycle before the specific point A, the constant current charging capacity ratio increases and the constant voltage charging capacity ratio decreases. Therefore, the control unit 120 may diagnose the state of the battery as a negative electrode stabilization state in the charging cycle before the specific point A.

Conversely, in the charging cycle after the specific point A, it can be seen that the constant current charging capacity ratio decreases and the constant voltage charging capacity ratio increases. Therefore, the control unit 120 may diagnose the state of the battery as a deterioration state in the charging cycle after the specific point A.

That is, the control unit 120 may diagnose that the state of the battery changes from the negative electrode stabilization state to the deterioration state based on the specific point A.

Preferably, if the total charging capacity of the battery decreases during the charging cycle of the battery, the control unit 120 may be configured to calculate the constant current charging capacity ratio and the constant voltage charging capacity ratio.

For example, the control unit 120 may compare the charging total capacity of the previous charging cycle with the charging total capacity of the current charging cycle, and determine whether to calculate the constant current charging capacity ratio and the constant voltage charging capacity ratio based on the comparison result.

As described above, when the charging total capacity is reduced, the state of the battery may be a deterioration state or a negative electrode stabilization state. Therefore, the control unit 120 may be configured to first check whether the charging total capacity of the battery for the charging cycle is reduced and then calculate the constant current charging capacity ratio and the constant voltage charging capacity ratio.

For example, if the charging total capacity decreases, the constant current charging capacity ratio increases, and the constant voltage charging capacity ratio decreases, the control unit 120 may diagnose the state of the battery as a negative electrode stabilization state.

As another example, if the charging total capacity decreases, the constant current charging capacity ratio decreases, and the constant voltage charging capacity ratio increases, the control unit 120 may diagnose the state of the battery as a deterioration state.

If the charging total capacity does not decrease according to the charging cycle, the actual state of the battery may not be a negative electrode stabilization state or a deterioration state even if the constant current charging capacity ratio and the constant voltage charging capacity ratio change. Therefore, in order to use system resources efficiently, the apparatus 100 for diagnosing a battery may first check whether the charging total capacity decreases according to the charging cycle and then calculate the constant current charging capacity ratio and the constant voltage charging capacity ratio.

Meanwhile, the control unit 120 may be configured to compare the charging total capacity of the previous charging cycle and the charging total capacity of the current charging cycle when the current charging cycle of the battery is included within a preset criterion cycle section R.

As described above, the negative electrode stabilization state may appear mainly in the early cycle when the battery begins to be used. For example, the negative electrode stabilization state may appear from 1 cycle to 50 cycles.

Therefore, the apparatus 100 for diagnosing a battery may diagnose whether the charging total capacity is reduced when the current charging cycle of the battery is included within the preset criterion cycle section R, by taking into account the specificity of the negative electrode stabilization state. In addition, the apparatus 100 for diagnosing a battery may efficiently use system resources by calculating the constant current charging capacity ratio and the constant voltage charging capacity ratio only when the charging total capacity decreases.

Figure 5:
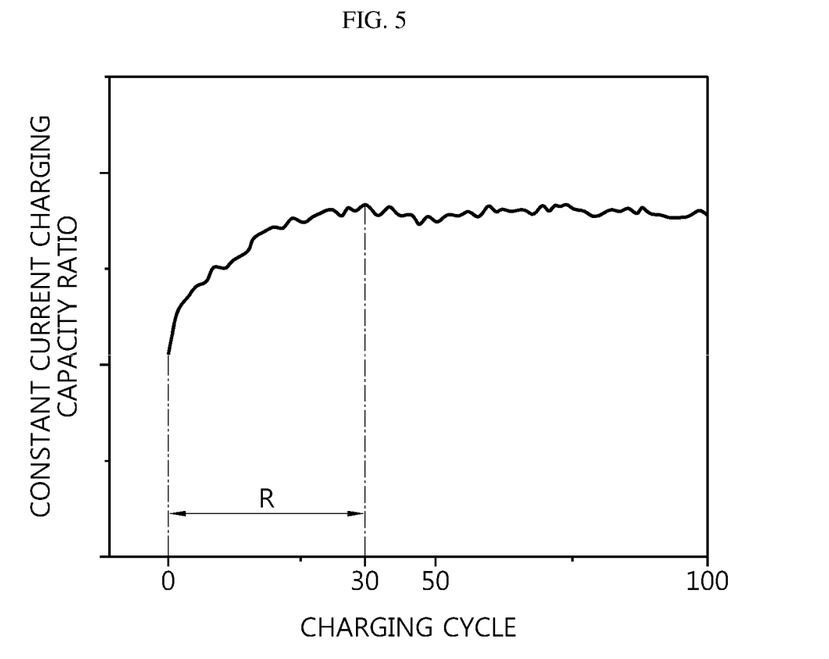
FIG. 5 is a diagram schematically showing a constant current charging capacity ratio profile according to another embodiment of the present disclosure.

FIG. 5 is a diagram schematically showing a constant current charging capacity ratio profile according to another embodiment of the present disclosure. Specifically, FIG. 5 is a diagram showing an X-Y two-dimensional graph when X is set to the charging cycle and Y is set to the constant current charging capacity ratio.

Figure 6:
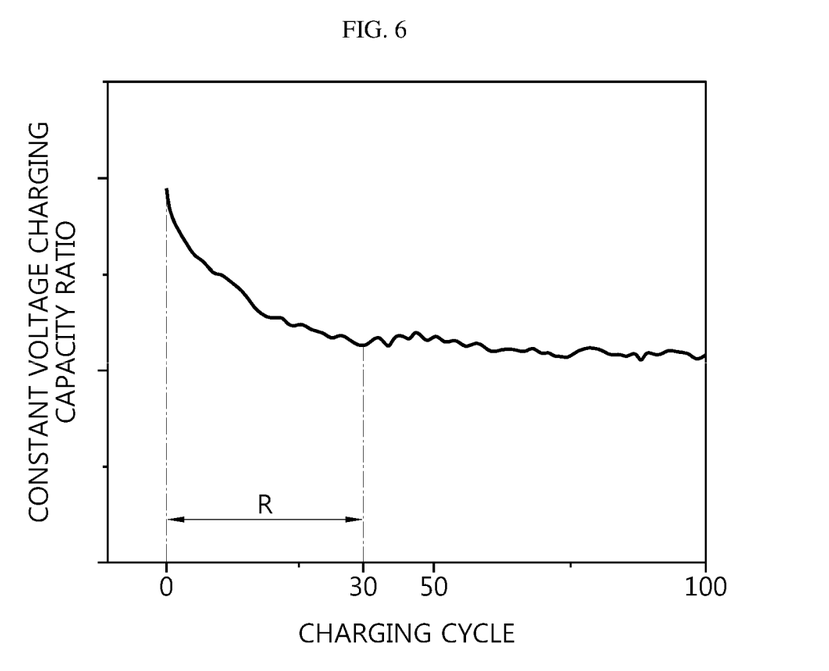
FIG. 6 is a diagram schematically showing a constant voltage charging capacity ratio profile according to another embodiment of the present disclosure.

FIG. 6 is a diagram schematically showing a constant voltage charging capacity ratio profile according to another embodiment of the present disclosure. Specifically, FIG. 6 is a diagram showing an X-Y two-dimensional graph when X is set to the charging cycle and Y is set to the constant voltage charging capacity ratio.

In the embodiments of FIGS. 5 and 6, 0 cycle to 30 cycles may be preset to a criterion cycle section R. In other words, within the criterion cycle section R, the state of the battery may be diagnosed as a negative electrode stabilization state.

Referring to FIG. 5, as the charging cycle increases in the criterion cycle section R, the constant current charging capacity ratio increases. Also, referring to FIG. 6, as the charging cycle increases in the criterion cycle section R, the constant voltage charging capacity ratio decreases. Accordingly, the control unit 120 may diagnose the state of the battery within the criterion cycle section R as a negative electrode stabilization state.

The control unit 120 may be configured to maintain a charging cut-off condition of the battery when the state of the battery is diagnosed as a negative electrode stabilization state. As described above, the negative electrode stabilization state is a state that may appear in a normal battery. Accordingly, the control unit 120 may not change the charging cut-off condition preset for the battery when the state of the battery is diagnosed as a negative electrode stabilization state.

Conversely, when the state of the battery is diagnosed as a deterioration state, the control unit 120 may change the charging cut-off condition preset for the battery. Preferably, when the state of the battery is diagnosed as a deterioration state, the control unit 120 may change at least one of the charging cut-off conditions to quickly terminate charging of the battery.

For example, the charging cut-off condition may include conditions regarding a cut-off voltage, a cut-off current, and a cut-off time.

The cut-off voltage may mean a voltage at a point when CC charging ends. The CC charging progresses until the battery voltage reaches the set cut-off voltage, and the CV charging may begin when the battery voltage reaches the cut-off voltage. For example, the control unit 120 may reduce the cut-off voltage when the battery state is diagnosed as a deterioration state. In this case, because the available voltage section of the battery is reduced, use of the battery at high voltage is limited, and thus deterioration of the battery may be prevented or alleviated.

The cut-off current may mean a current at a point when CV charging ends. During the CV charging process of the battery, the voltage of the battery is kept constant to correspond to the cut-off voltage, and the charging current may be reduced. Also, when the charging current reaches the cut-off current, charging of the battery may be terminated. For example, if the state of the battery is diagnosed as the deterioration state, the control unit 120 may increase the cut-off current. In this case, as the CV charging cut-off current of the charging cycle of the battery is increased, the time during which the battery stays at high potential may decrease.

The cut-off time may mean the time required for CV charging. For example, if the state of the battery is diagnosed as a deterioration state, the control unit 120 may reduce the cut-off time. In this case, battery charging may be terminated earlier than before. The apparatus 100 for diagnosing a battery according to an embodiment of the present disclosure has the advantage of setting the charging condition to correspond to the current state of the battery by maintaining or changing the charging cut-off condition according to the state of the battery being diagnosed. In this way, since deterioration of the battery may be prevented based on the charging condition set for each charging cycle, the life expectancy of the battery may be increased.

The apparatus 100 for diagnosing a battery according to the present disclosure may be applied to a battery management system (BMS). That is, the BMS according to the present disclosure may include the apparatus 100 for diagnosing a battery described above. In this configuration, at least some of components of the apparatus 100 for diagnosing a battery may be implemented by supplementing or adding functions of the components included in a conventional BMS. For example, the data obtaining unit 110, the control unit 120 and the storage unit 130 of the apparatus 100 for diagnosing a battery may be implemented as components of the BMS.

Figure 7:
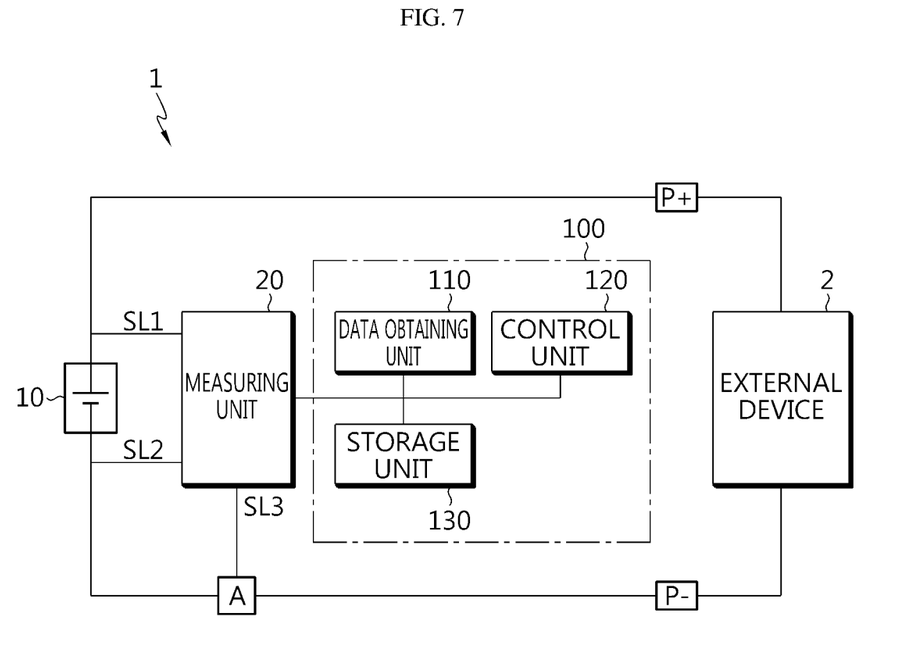
FIG. 7 is a diagram schematically showing an exemplary configuration of a battery pack according to another embodiment of the present disclosure.

FIG. 7 is a diagram schematically showing an exemplary configuration of a battery pack 1 according to another embodiment of the present disclosure.

Additionally, the apparatus 100 for diagnosing a battery according to the present disclosure may be provided in the battery pack 1. That is, the battery pack 1 according to the present disclosure may include the above-described apparatus 100 for diagnosing a battery, the measuring unit 20 and at least one battery 10. Additionally, the battery pack 1 may further include electrical components (relays, fuses, etc.) and a case.

The positive electrode terminal of the battery 10 may be connected to the positive electrode terminal P+ of the battery pack 1, and the negative electrode terminal of the battery 10 may be connected to the negative electrode terminal P− of the battery pack 1.

The measuring unit 20 may be connected to a first sensing line SL1, a second sensing line SL2, and a third sensing line SL3. Specifically, the measuring unit 20 may be connected to the positive electrode terminal of the battery 10 through the first sensing line SL1, and may be connected to the negative electrode terminal of the battery 10 through the second sensing line SL2. The measuring unit 20 may measure the voltage of the battery 10 based on the voltage measured at each of the first sensing line SL1 and the second sensing line SL2.

Also, the measuring unit 20 may be connected to the current measurement unit A through the third sensing line SL3. For example, the current measurement unit A may be a current meter or a shunt resistance capable of measuring the charging current and discharging current of the battery 10. The measuring unit 20 may calculate the charging amount by measuring the charging current of the battery 10 through the third sensing line SL3. Additionally, the measuring unit 20 may calculate the discharging amount by measuring the discharging current of the battery 10 through the third sensing line SL3.

The external device 2 may be a charging device or load that can be connected to the battery pack 1. Specifically, one end of the external device 2 may be connected to the positive electrode terminal P+ of the battery pack 1, and the other end may be connected to the negative electrode terminal P− of the battery pack 1. Accordingly, the positive electrode terminal of the battery 10, the positive electrode terminal P+ of the battery pack 1, the external device 2, the negative electrode terminal P− of the battery pack 1, and the negative electrode terminal of the battery 10 may be electrically connected.

Figure 8:
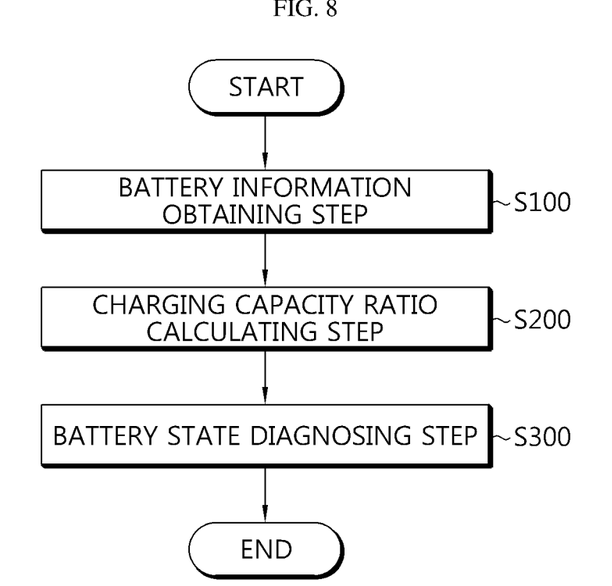
FIG. 8 is a diagram schematically showing a method for diagnosing a battery according to still another embodiment of the present disclosure.

FIG. 8 is a diagram schematically showing a method for diagnosing a battery according to still another embodiment of the present disclosure.

Preferably, each step of the method for diagnosing a battery may be performed by the apparatus for diagnosing a battery. Hereinafter, the content overlapping with the previously described content will be briefly described or omitted.

The battery information obtaining step (S100) is a step of obtaining battery information including voltage and current of a battery during a charging cycle of the battery, and may be performed by the data obtaining unit 110.

For example, the data obtaining unit 110 may obtain battery information including the voltage and current of the battery in the charging cycle. For example, the data obtaining unit 110 may obtain battery information including the voltage and current of the battery measured during the CC-CV charging process of the battery.

For example, the data obtaining unit 110 may obtain the battery information including the voltage and current of the battery in real time during the charging cycle of the battery.

The charging capacity ratio calculating step (S200) is a step of calculating a constant current charging capacity ratio and a constant voltage charging capacity ratio during the charging cycle based on the battery information, and may be performed by the control unit 120.

For example, the control unit 120 may be configured to classify the charging total capacity in the charging cycle into a constant current charging capacity and a constant voltage charging capacity. Additionally, the control unit 120 may be configured to calculate a constant current charging capacity ratio and a constant voltage charging capacity ratio, respectively, based on the charging total capacity, the constant current charging capacity, and the constant voltage charging capacity.

Specifically, the control unit 120 may calculate the constant current charging capacity ratio by calculating the ratio of the constant current charging capacity to the charging total capacity in the charging cycle. Additionally, the control unit 120 may calculate the constant voltage charging capacity ratio by calculating the ratio of the constant voltage charging capacity to the charging total capacity.

Preferably, the control unit 120 may calculate the constant current charging capacity ratio and the constant voltage charging capacity ratio when the total charging capacity of the battery decreases during the charging cycle of the battery.

More preferably, the control unit 120 may calculate the constant current charging capacity ratio and the constant voltage charging capacity ratio when the current charging cycle of the battery is included in the preset criterion cycle section and the total charging capacity of the battery decreases.

The battery state diagnosing step (S300) is a step of diagnosing the state of the battery based on the constant current charging capacity ratio and the constant voltage charging capacity ratio, and may be performed by the control unit 120.

For example, if the constant current capacity charging ratio increases and the constant voltage charging capacity ratio decreases, the control unit 120 may diagnose the state of the battery as a negative electrode stabilization state.

As another example, if the constant current charging capacity ratio decreases and the constant voltage charging capacity ratio increases. the control unit 120 may diagnose the state of the battery as a deterioration state.

Preferably, the control unit 120 may diagnose the state of the battery based on the constant current charging capacity ratio and the constant voltage charging capacity ratio when the charging total capacity of the charging cycle decreases. More preferably, the control unit 120 may diagnose the state of the battery based on the constant current charging capacity ratio and the constant voltage charging capacity ratio when the current charging cycle of the battery belongs to the criterion cycle section and the charging total capacity of the charging cycle decreases.

The embodiments of the present disclosure described above may not be implemented only through an apparatus and a method, but may be implemented through a program that realizes a function corresponding to the configuration of the embodiments of the present disclosure or a recording medium on which the program is recorded. The program or recording medium may be easily implemented by those skilled in the art from the above description of the embodiments.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

Explanation of Reference Signs

1: battery pack
2: external device
10: battery
20: measuring unit
100: apparatus for diagnosing a battery
110: data obtaining unit
120: control unit
130: storage unit

What is claimed is:

1. An apparatus for diagnosing a battery, comprising:
a control unit configured to:
   determine a charging total capacity,
   obtain each of a constant current charging capacity and a constant voltage charging capacity from the charging total capacity,
   calculate a constant current charging capacity ratio and a constant voltage charging capacity ratio based on battery information including voltage and current of a battery during a charging cycle of the battery, wherein the constant current charging capacity ratio and the constant voltage charging capacity ratio are based on the charging total capacity, the constant current charging capacity and the constant voltage charging capacity, and diagnose a state of the battery based on the constant current charging capacity ratio and the constant voltage charging capacity ratio.

2. The apparatus for diagnosing a battery according to claim 1,
wherein the control unit is configured to diagnose the state of the battery based on an increase or decrease of each of the constant current charging capacity ratio and the constant voltage charging capacity ratio.

3. The apparatus for diagnosing a battery according to claim 2,
wherein the control unit is configured to diagnose the state of the battery as a negative electrode stabilization state in response to the constant current charging capacity ratio increasing and the constant voltage charging capacity ratio decreasing.

4. The apparatus for diagnosing a battery according to claim 3,
wherein the control unit is configured to maintain a charging cut-off condition of the battery in response to the state of the battery being diagnosed as the negative electrode stabilization state.

5. The apparatus for diagnosing a battery according to claim 2,
wherein the control unit is configured to diagnose the state of the battery as a deterioration state in response to the constant current charging capacity ratio decreasing and the constant voltage charging capacity ratio increasing.

6. The apparatus for diagnosing a battery according to claim 1,
wherein the control unit is configured to calculate the constant current charging capacity ratio and the constant voltage charging capacity ratio in response to the charging total capacity of the battery decreasing during the charging cycle of the battery.

7. The apparatus for diagnosing a battery according to claim 6,
wherein the control unit is configured to:
repeatedly determine a charging total capacity for multiple charging cycles of the battery,
in each given charging cycle, compare the charging total capacity of the given charging cycle with the charging total capacity of a previous charging cycle, and
determine whether to calculate the constant current charging capacity ratio and the constant voltage charging capacity ratio for the given charging cycle based on the comparison of the charging total capacity of the given charging cycle with the charging total capacity of the previous charging cycle.

8. The apparatus for diagnosing a battery according to claim 1,
wherein the control unit is configured to:
repeatedly determine a charging total capacity for multiple charging cycles of the battery, and
in each given charging cycle, compare the charging total capacity of the given charging cycle with the charging total capacity of a previous charging cycle in response to the given charging cycle being included within a preset criterion cycle section.

9. A battery pack, comprising the apparatus for diagnosing a battery according to claim 1.

10. A method for diagnosing a battery, comprising:
determining a charging total capacity;
obtaining each of a constant current charging capacity and a constant voltage charging capacity from the charging total capacity;
calculating a constant current charging capacity ratio and a constant voltage charging capacity ratio based on battery information including voltage and current of a battery during a charging cycle of the battery, wherein the constant current charging capacity ratio and the constant voltage charging capacity ratio are based on the charging total capacity, the constant current charging capacity and the constant voltage charging capacity; and
diagnosing a state of the battery based on the constant current charging capacity ratio and the constant voltage charging capacity ratio.

* * * * *